INVENTOR:
NOYES D. SMITH, JR.
BY: A. H. McCarthy
HIS AGENT

June 8, 1965  N. D. SMITH, JR  3,187,831
SEISMIC SURVEYING SYSTEM FOR WATER-COVERED AREAS
Filed Dec. 22, 1961  3 Sheets-Sheet 2

INVENTOR:
NOYES D. SMITH, JR.
BY: A. H. McCarthy
HIS AGENT

June 8, 1965  N. D. SMITH, JR  3,187,831
SEISMIC SURVEYING SYSTEM FOR WATER-COVERED AREAS
Filed Dec. 22, 1961  3 Sheets-Sheet 3

INVENTOR:
NOYES D. SMITH, JR.
BY: A. H. McCarthy
HIS AGENT

Patented June 8, 1965

3,187,831
SEISMIC SURVEYING SYSTEM FOR WATER-COVERED AREAS

Noyes D. Smith, Jr., Bellaire, Tex., assignor to Shell Oil Company, New York, N.Y., a corporation of Delaware
Filed Dec. 22, 1961, Ser. No. 161,728
21 Claims. (Cl. 181—.5)

This invention relates to an apparatus and method of seismic prospecting for geological structures disposed beneath a body of water and pertains more particularly to a method and apparatus of imparting energy to a body of water and to the ground below it for seismic prospecting purposes wherein a substantially continuous line of explosive is detonated in a manner to control the direction of downward travel of maximum seismic energy.

One of the more commonly employed methods of surveying geological formations in water-covered areas is described in U.S. Patent 2,465,696 to L. R. C. Paslay. In this method, seismic signals are initiated from an explosive charge lowered into a body of water from a moving vessel and fired by control means from the vessel when the vessel has proceeded along a predetermined course for a distance sufficient to cause a flexible elongated streamer having a plurality of piezo-electric seismometers arranged at intervals therein to be positioned above or to one side of the explosion. The pressure applied to the seismometers by the surrounding water in response to seismic signals reflected from subsurface geological formations and tectonic structures in the earth beneath the explosion causes voltage signals to be generated by the seismometers corresponding respectively to the seismic signals received thereby. These electric signals are amplified and recorded on a moving tape or chart on the vessel in timed-spaced relation with respect to a start signal recorded thereon as the firing circuit for the initial explosion is closed, the exact geophysical location of the explosion being determined by signals received from a plurality of sono-buoys moored within the vicinity of the explosion, and recorded on the moving chart.

Various modifications of this method are employed. For example, some surveying parties tow the streamer or cable containing the seismometers below or to one side of the explosive charge. Additionally, in initiating seismic signals in water-covered areas, it is customary for safety reasons to employ a second vessel which plants the explosive charges over the center of the seismometer cable at a depth beneath the surface of the water where the gas bubble generated by the explosion can break through the surface of the water on its first expansion. The vessel towing the seismometer cable may also be provided with radio-location equipment or other means for determining the location of the vessel at any time. It has been found that it is necessary to tow the cable containing the linear array of seismometers at a critical depth in order to minimize the reception of unwanted seismic signals which are propagated in the water layer. Other systems are used in which explosives are suspended from a buoy which is floated behind a vessel, the explosives carried thereby being detonated when they have reached the center of the cable.

It is therefore a primary object of the present invention to provide a method and apparatus for use in seismic surveying work over water-covered areas whereby the use of charges of high explosives to generate a seismic signal may be eliminated, thus eliminating the use of dangerous explosives, precluding the possibility of killing fish and eliminating the use of a second boat to carry the explosives.

Another object of the present invention is to provide a method and apparatus for use in seismic surveying work over water-covered areas wherein an elongated sound source and an elongated sound detecting apparatus are towed by a boat at some predetermined position to each other.

A further object of the present invention is to provide a gas container for creating a seismic sound source for use in water-covered areas, said container having a substantially constant buoyancy.

A still further object of the present invention is to provide a sound source apparatus for use in seismic surveying over water-covered areas wherein most of the energy transmitted by the sound source is in frequencies of interest to seismic surveying.

Another object of the present invention is to provide a linear sound source system for use in seismic surveying over water-covered areas, said sound source having characteristics making it possible to attain a high signal-to-noise ratio.

It is also an object of the present invention to provide a method and apparatus for use in seismic surveying over water-covered areas wherein explosive energy is created over an area of predetermined configuration.

Another object of the present invention is to provide a method and apparatus for use in seismic surveying over water-covered areas wherein both the sound source and the seismometer cable can be located at a suitable water depth to minimize "singing."

Still another object of the present invention is to provide a linear sound source for use in seismic surveying operations, which sound source does not produce either the very high or low frequencies which are undesirable in seismic prospecting.

It is a further object of the present invention to provide a method for seismic surveying operations over water-covered areas where the use of high explosives as a sound source is prohibited by law.

Another object of the present invention is to provide an apparatus for use in seismic surveying operations over water-covered areas where it is desired to change or control the angle of maximum directivity of a downwardly traveling seismic wave in order to study steeply dipping formations.

Further objects of the present invention will be understood from the following description taken with regard to the drawing wherein.

Figure 1:
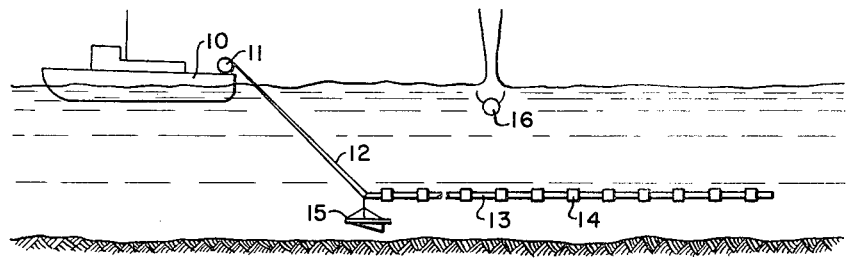
FIGURE 1 is a schematic view showing the relative positions of a towing vessel, seismometer spread, and explosive charge as commonly used in a presently known system.

As illustrated in FIGURE 1 of the drawing, the common method of carrying out seismic exploration work over water-covered areas is accomplished by means of a vessel 10 having a cable reel 11 mounted on the stern thereof for letting out or reeling in a lead-in or tow cable 12 to which is connected a detector streamer which comprises a flexible cable 13 having a plurality of seismometers or hydrophones 14 mounted therein or thereon in spaced relationship along the length of the cable 13. Any suitable type of weighting device 15 is secured to the leading end of the cable 13 so as to maintain it at a predetermined depth in the water. Normally the cable 13 has a neutral buoyancy so that it will stream out behind the weighting device 15 in a horizontal position at a constant depth in the water. The lead-in cable 12 contains the necessary electrical leads to connect the seismometers 14 to the recording equipment carried on board the vessel 10. The cable of seismometers 14 is towed a safe distance behind the vessel 10 so that a charge of high explosives 16 may be detonated when it is substantially opposite the midpoint of the cable 13. The explosive charge 16 is normally suspended in the water from a float and may be launched by either the recording vessel 10 or another vessel. It is customary to have the explosive charge positioned at a depth below the surface of the water so that the gas bubble generated by the explosion breaks through the surface on its first expansion, as illustrated in FIGURE 1.

Figure 2:
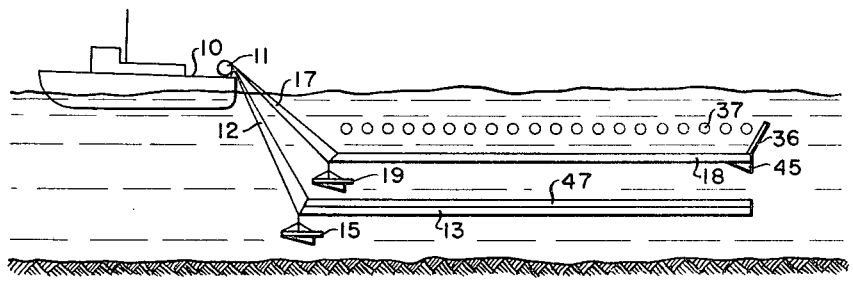
FIGURES 2 and 3 are schematic views of an over-water seismic surveying system in accordance with the present invention.

In accordance with the present invention, the use of a high explosive charge 16 (FIGURE 1) has been eliminated by providing an extended linear sound source to generate seismic waves in a body of water. In FIGURE 2, the vessel 10 is shown as being provided with one or more cable reels 11 from which a pair of towing cables 12 and 17 are pulled at an angle into the water by means of weighting devices 15 and 19. The detector streamer or seisomometer cable 13 is similar to the one described hereinabove with regard to FIGURE 1 while the cable 18 secured to the towing cable 17 constitutes one form of a gas discharge unit or housing which may be of flexible or rigid construction.

Figure 4:
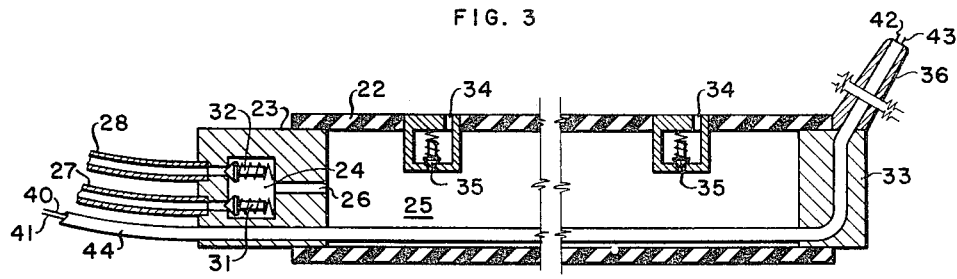
FIGURE 4 is a side view taken in longitudinal cross-section of a linear sound source container in accordance with the present invention.

The gas discharge unit 18 is preferably in the form of a flexible hose or body member 22 (FIGURE 4) of small diameter, say, 1 to 6 inches. The body member may be made of any suitable plastic, rubber or rubber-like material of a thickness suitable. In order to strengthen the body member various types of materials such as thread, fabrics, or wire may be molded therein. The leading end of the body member 22 is closed by a plug 23 in which a mixing chamber 24 is formed. The mixing chamber 24 is in communication with the elongated chamber 25 within the body member 22 through a flow passage or choke 26. A pair of conduits 27 and 28 are in communication with the chamber 25. Unidirectional flow of gas through the conduits 27 and 28 is controlled by suitable valves, such as a pair of spring-loaded check valves 31 and 32 which are mounted in the plug 23.

The trailing end of the flexible body member 22 of the linear sound source may be left open at all times but is preferably closed by a plug 33. The body member 22 is provided with at least one, and preferably with a plurality, of spaced discharge ports 34 which are normally closed by means of spring-loaded check valves 35. When open, the valves 35 permit gas to flow outwardly through discharge ports 34. The valves 35 are set to open at the same pressure.

The gas discharge unit of the present invention is provided with any suitable type of firing apparatus for igniting or detonating an explosive mixture of gas at a predetermined height above the body member 22 as it rises therefrom. One form of firing mechanism is diagrammatically illustrated in FIGURES 2 to 4 as an upwardly-extending wand 36 secured to the body member near the ports 34 and extending to a height at which it is desired to denonate gas bubbles 37. A pair of electrical contacts 42 and 43 on the top of the sparking probe or wand 36 spark gap which is sufficient to ignite many explosive mixtures of combustible gases.

There are a number of gaseous mixtures which will detonate upon exposure to visible or ultraviolet light. A particularly effective mixture is hydrogen and chlorine which can be caused to react violently to produce hydrogen chloride in an explosive manner when a mixture of these gases is irradiated with light of wavelength between 2800 and 5000 Angstrom units. Thus bubbles of a mixture of hydrogen and chlorine may be detonated by a light source at the top of the wand or the light source may be independently towed in the vicinity on a separate cable. The electrical leads 40 and 41 from contacts 42 and 43 are suitably insulated and formed as a cable 44 which in turn may be wrapped together with gas conduits 27 and 28 to form the towing cable for the linear gas discharge unit. The electrical cable is connected to suitable circuits (not shown) on board the vessel 10 (FIGURE 2) for firing the gas bubbles 37 at a predetermined height above the cable 18. If desired, multiple wands with spark gaps or other gas detonating devices may be employed at spaced intervals along the body member. One or more stabilizing elements or keels 45 may be secured to the cable below the wand 36 to keep it upright.

Figure 5:
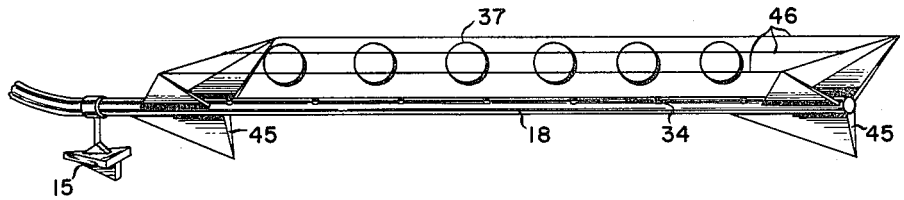
FIGURE 5 is a schematic view of the sound source in accordance with this invention in which electrically heated wires are used to detonate the gas bubbles when they intersect the wires.

One method for making certain that all the bubbles of explosive gas are detonated simultaneously is illustrated in FIGURE 5. Here bubbles released from valves 34 in the tubular body 18 rise to intersect resistance wires 46 which are continuously heated by an electrical current source and are cooled by the water through which the device is being towed. When a portion of the wire is enclosed in a gas bubble, its temperature will rise because of the low thermal conductivity and heat capacity of the gas mixture as compared to the water.

Figure 6:
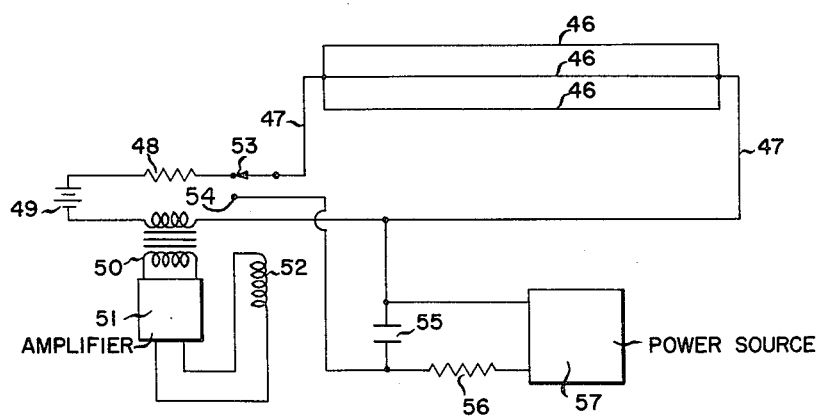
FIGURE 6 is a schematic circuit diagram for the arrangement shown in FIGURE 5.
Figure 7:
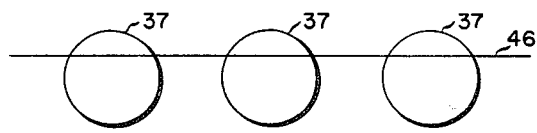
FIGURE 7 is an enlarged view of several gas bubbles after intersecting the heated wires shown in FIGURES 5 and 6.

FIGURE 7 shows portions of the resistance wires 46 inside explosive gas bubbles 37. This change in resistance is used as shown in the schematic diagram in FIGURE 6 to trigger a condenser discharge through the wire to heat it to a sufficiently high temperature to detonate the explosive gas bubbles. In the circuit shown in FIGURE 6, a battery 49 sends a current through resistor 48, relay contact 53, cable 47, resistance wires 46, cable 47, and primary of transformer 50. When gas bubbles enclose a portion of resistance wires 46, the resistance increases and produces a decrease of current through the primary of transformer 50. This signal is amplified and rectified by amplifier 51. The output of amplifier 51 is connected to relay coil 52 which is actuated by the signal causing relay contact 53 to be opened and contact 54 to be closed. When contact 54 is closed, the condenser 55 is discharged through the resistance wires 46. After discharge, condenser 55 is recharged by high voltage power source 57 through resistor 56.

The three strands of wire 46 are arranged in a plane above the tubular body 18 so that a drift of the bubbles to either side of the body 18 produced by water currents will not prevent the intersection of the bubbles by wires 46.

Figure 8:
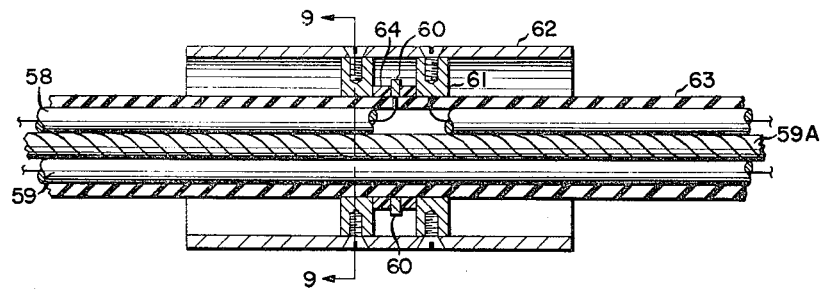
FIGURE 8 is a longitudinal section of a portion of an electrical cable and spark gaps which can be used to detonate the gas bubbles.

Another method for detonating the bubbles is to replace the resistance wires 46 in FIGURE 5 by a cable containing a series of spark gaps shunted by high resistances. A section of a portion of such a cable is shown in FIGURE 8. In FIGURE 8, spark gap electrodes 60 and 61 consisting of metal rings on a rubber-covered two-conductor cable 63 are shunted by high resistances 64. These high resistances may be composed of ceramic material or conducting rubber rings. Conductors 58 and 59 connect the gaps in series. A tow cable 59a may be positioned in the cable 63.

Figure 9:
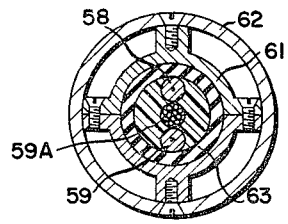
FIGURE 9 is a cross section through the spark gap along section AA' in FIGURE 8.
Figure 10:
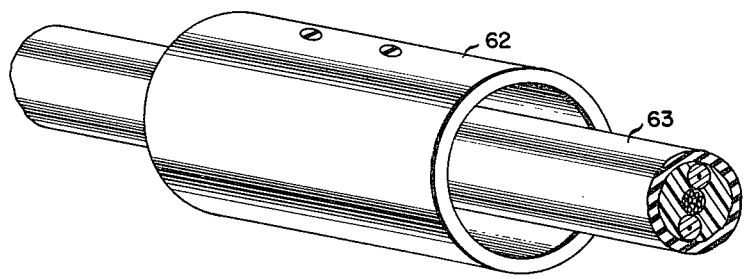
FIGURE 10 is a sketch showing one such spark gap on the portion of cable.

FIGURE 9 shows a cross section of the spark gap shown in FIGURE 8 along the section AA'. FIGURE 10 is a sketch of one such spark gap assembly attached to cable 63. The tubular shield 62 is used to initiate a detonating wave in the explosive gas mixture when a spark is discharged inside. In many gaseous mixtures, a high velocity detonation wave cannot be produced by a point source in a large volume of the gaseous mixture.

Figure 11:
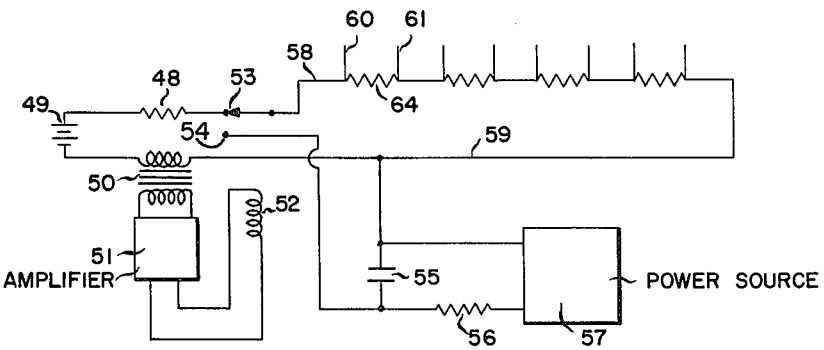
FIGURE 11 is a circuit diagram for use with the spark cable shown in FIGURE 8.

FIGURE 11 shows a schematic circuit diagram for use of spark gaps to detonate the gas bubbles. Battery 49 sends a current through resistance 48, relay contact 53, conductor 58 and the gaps 60, 61 shunted by resistances 64, conductor 59, and primary of transformer 50. When none of the gaps are enclosed in gas bubbles, the gaps 60, 61 are shunted by the conducting water. When a gap is enclosed in a gas bubble, the resistance across the gap increases, producing a decrease in current through the primary of transformer 50. This signal is amplified and rectified by amplifier 51 which energizes relay coil 52, thus causing relay contact 53 to open and relay contact 54 to close. The closing of relay contact 54 connects high voltage condenser 55 to the series connected gaps. Those gaps which are enclosed in gas bubbles will break down over the surface of the high resistant shunts 64 and will initiate the detonation of the explosive gas bubbles 37. After the discharge relay contact 54 is opened and contact 53 is closed, the condenser 55 is charged again through resistor 56 by the high voltage power supply 57 and the circuit is ready for another sequence of operations.

In the operation of the present linear sound source unit, air and a combustible gas flow, or are pumped, from the vessel 10 (FIGURE 2) through conduits 27 and 28 (FIGURE 4) in proportions desired, to form an explosive mixture when mixed together in the chamber 24 of the plug 23. The explosive mixture flows through choke 26 and fills the elongated chamber 25 within the body member 22. When it is desired to make a seismic record, gas is pumped into chamber 25 for a time and at a pressure sufficient to cause small volumes of gas to be forced past valves 35 and out discharge ports 34 (FIGURE 4) so as to form a series of gas bubbles 37 (FIGURE 2) which expand as they rise in the water. After a predetermined time interval current is passed through the electrical leads 40 and 41 to cause a spark to jump across the gaps formed by contacts 42 and 43, or to flash a light momentarily. The spark initiates an explosion of the bubbles of gaseous mixture essentially simultaneously along the entire line of bubbles 37, and the seismic wave formed thereby is transmitted through the surrounding water and into the ocean floor.

The average buoyancy of a sound source unit 18 (FIGURE 2) would remain nearly constant since the chamber thereof would be filled at all times with an explosive gaseous mixture or air used to sweep it out. The natural buoyancy of the linear sound source unit 18 would depend on the manner in which it was constructed and the manner in which the sound source unit was intended to be used. In one form, the seismic sound source of the present invention will be constructed to have a neutral buoyancy, that is, one which will tend to maintain the same position in the water either when stationary in the water or when towed by a vessel so that it is strung out in back of a weighting device 19, as shown in FIGURE 2. However, in many applications of the present invention it is desired to employ a linear sound source unit of negative buoyancy so that, when towed at the end of a tow line 17 (FIGURE 2) the trailing end of the linear sound source unit 18 will be substantially lower in the water than the lead end and will maintain that position while towed at a constant speed. The angle formed between the surface of the water and the sloping linear sound source unit may be anywhere from zero to 75°, depending upon the type of signal it is desired to obtain. Adjustment of the buoyancy may be carried out by supplying weights to the linear sound source unit in a manner well known to the art, or heavy materials may be incorporated in the linear sound source unit during its construction. Alternatively, the linear sound source unit 18 could be provided with a series of floats either attached to it or provided therein, in a manner well known to the art to give the sound source unit greater buoyancy. Thus, when a linear sound source unit 18 of positive buoyancy was towed after the weighting device 19, the trailing end of the linear sound source unit would be substantially closer to the surface of the water than the lead end of the sound source unit.

The linear sound source unit 18 of the present invention may be towed by a vessel 10 in various positions relative to a seismometer cable 13. As illustrated in FIGURE 2, the linear sound source unit is shown as being towed parallel to and above a flexible seismometer 13. However, the linear sound source unit 18 could also be towed parallel to the seismometer cable 13 to one side thereof or below, as desired. Additionally, one or more seismometer cables may be towed adjacent a linear sound source unit 18, for example, with one seismometer cable on each side of the sound source or with one seismometer cable above and one below the sound source. It is further possible to employ a plurality of linear sound source cables 18 which are preferably towed at the same depth in the water but spaced from each other horizontally so as to cover a substantial area. A spread of linear sound source units of this type may be used with any particular type or arrangement of flexible seismometer cables. Instead of being towed continuously, the sound source units 18 may be stationary at the time of a detonation. Additionally, while the sound source unit has been described hereinafter as being linear, it is to be understood that it could be constructed in any desired geometrical configuration, e.g., round, rectangular, etc., and either towed or employed in a stationary manner to discharge a plurality of gas bubbles in a selected pattern. In one form of the present invention it is contemplated using a circular gas discharge unit stationary at a predetermined depth to discharge a ring of bubbles could be detonated by a suitably shaped gas discharge unit.

Figure 3:
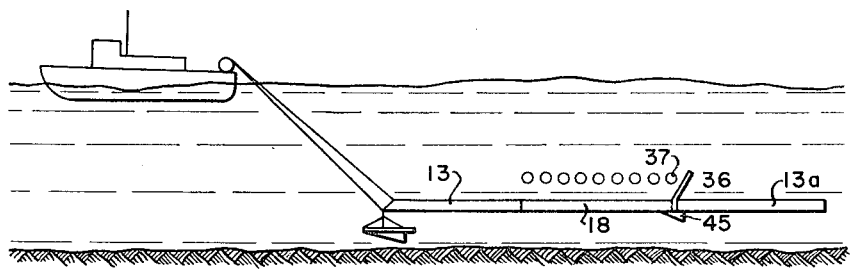

A particularly good arrangement of the present linear sound source unit with a pair of seismometer cables is illustrated in FIGURE 3 wherein the linear sound source unit is connected end-to-end with a pair of seismometer cables 13 and 13a which are towed in alignment by the vessel 10. In this form it is apparent that the seismometer cable 13 must be provided either inside or outside thereof with suitable gas conduit means and electrical leads for supplying gas to the linear sound source unit 18 and igniting the gas bubbles 37 discharged therefrom at any desired time interval. While the linear sound source unit of the present invention has been shown in FIGURE 4 as being provided with a pair of conduits 27 and 28 for supplying gases such as air and acetylene to the mixing chamber 24, it is quite apparent that an explosive mixture of gas may be formed on board ship and pumped or otherwise forced down a single conduit into the elongated chamber 25 of the linear sound source unit. A gas mixture of hydrogen and chlorine is especially useful in that it may be detonated by use of an ultraviolet light instead of a spark gap at the top of the wand 36, and, if desired, mixtures of these gases may be detonated by sunlight at shallow depths.

The seismic signal generated by the sound source unit of the present invention has many advantages over other sources of seismic signals. At the present time it is not possible to place a charge of high explosives at the proper depth to insure the best recording because of the necessity of eliminating the pulsations of the bubble of gas that is formed by such an explosive. The use of high explosives in essentially a point source causes the generation of very high pressures at high frequencies near the source in order to obtain sufficient pressure in the relatively low frequency band between 30 and 60 cycles which are important in seismic prospecting. Thus, with high explosives most of the energy is in high frequency bands. However, if a large spherical volume of explosive gas were used as a seismic sound source, most of the energy discharged by such a source would be in frequencies lower than the seismic frequency desired for seismic surveying operations.

A string of exploding gas bubbles resembles in action an exploding cylinder of gas and is superior to other sources of seismic energy in that, because of its small diameter, it concentrates more of the energy of the explosive gas in frequency bands of interest to seismic prospecting. The large pressures at high frequencies are eliminated when the firing time is selected so that the bubbles are of a predetermined size, i.e., not of a size yielding high frequencies. By distributing the sound source in a linear arrangement, with the length of the line of gas bubbles being up to several wavelengths at the frequencies it is desired to study, a large gain in signal-to-noise ratio is obtained. Thus, with the method of the present invention, both the linear sound source unit and the sound receiver or seismometer cable can be located at a suitable depth in the water to minimize "singing" which frequently prevents the recording of useful seismic data in water-covered areas. The length of the linear sound source unit prevents the excitation of certain types of this "singing." Additionally, marine life is not damaged by the exploding gas bubbles of the present invention. The linear sound source unit described would be reasonably safe, as compared with high explosives, since the explosive gas and air need not be combined in an explosive mixture until they were in the mixing chamber. This would allow use of a single vessel for both initiating and recording seismic signals whereas in general two boats are normally used for this work at the present time.

In order to take advantage of all of the possibilities of the gas discharge unit of the present invention, it is desirable to incorporate a depth sensing means in the cable to determine the depth of the cable below the surface of the water at a number of points along the length of the cable. Additionally, a servo-system is preferably incorporated in the cable so as to permit changing the buoyancy of the cable to maintain it at a specified depth.

In the method of the present invention, the outgoing signal or frequency response from the line of exploding gas bubbles 37 is changed by any change in coupling between the cable 18 and the bubbles 37 (FIGURE 2). Coupling between the cable and the bubbles can be changed by suitable selection or change in size of the cable 18 or in the material of which it is made, by selection of the size of the bubbles being exploded, by exploding the gas bubbles at varying distances from the cable 18, or by towing an additional but non-gas-discharging cable in spaced relation with the gas-discharging cable 18. In FIGURE 2, an inert or inoperative cable 47 is shown as being towed with the seismometer cable 13 although it could be towed separately. Since any of the cables act as reflectors for the signal obtained from the detonated gas bubbles, the frequency distribution of the signal can be controlled by changing the pattern of the cables.

I claim as my invention:

1. In seismic prospecting for geological structures disposed beneath a body of water, a method of creating explosive energy over an area of predetermined configuration, said method comprising the steps of disposing in said water at a predetermined depth and position an isolated volume of an explosive gas, discharging substantially simultaneously from said isolated gas volume a plurality of small volumes of said explosive gas at spaced intervals from each other and into the surrounding water to create a sound source area of predetermined geometrical configuration formed by a plurality of gas bubbles, igniting said bubbles of said discharged gas over the extent of said area of bubbles to generate an explosive wave front radiating from said bubbles.

2. In seismic prospecting for geological structures disposed beneath a body of water, a method of creating explosive energy over an area of predetermined configuration, said method comprising the steps of disposing in said water at a predetermined depth and position a container for a gas, forcing a quantity of an explosive gas into one end of said container in a quantity to fill it, substantially simultaneously discharging a plurality of small volumes of said explosive gas from said container at spaced intervals therealong and into the water above said container to create a sound source area of predetermined geometrical configuration formed by a plurality of gas bubbles, igniting said bubbles of said discharged gas substantially simultaneously over the extent of said bubbles and at a predetermined distance from said container to generate an explosive wave front radiating from said bubbles.

3. The method of claim 2 wherein the gas container is positioned horizontally at the time gas is discharged therefrom.

4. The method of claim 2 wherein the gas container is positioned at an angle to the horizon at the time gas is discharged therefrom.

5. In seismic prospecting for geological structures disposed beneath a body a body of water, a method of creating explosive energy along a substantially continuous line, said method comprising the steps of disposing in said water at a predetermined depth and position an elongated flexible container for a gas, continuously forcing a quantity of an explosive gas into one end of said container in a quantity to fill it, periodically discharging a plurality of small volumes of said explosive gas from said container at spaced intervals therealong and into the water above said container to create a sound source formed by a string of gas bubbles, periodically igniting said line of bubbles of said discharged gas substantially simultaneously along the length of said string of bubbles and at a predetermined distance from said container to generate an elongated cylindrical wave front radiating from said string of bubbles.

6. The method of claim 5 wherein the container is arranged in a straight line.

7. The method of claim 7 wherein the container is arranged in a substantially closed configuration having a closed periphery.

8. The method of claim 5 wherein the container is arranged in a circle.

9. The method of claim 5 wherein the container is arranged in a substantially closed rectangular configuration.

10. In seismic prospecting for geological structures disposed beneath a body of water, a method of creating explosive energy along a substantially continuous line, said method comprising the steps of disposing in said water at a predetermined depth and position an elongated flexible tubular container for a gas, towing said container through said water along a substantially continuous line at a predetermined depth and position, continuously forcing a quantity of said explosive gas mixture into one end of said container in a quantity to fill it, periodically discharging a plurality of small volumes of said explosive gas from said container at spaced intervals therealong and into the water adjacent said container to create a linear sound source formed by a string of gas bubbles, periodically igniting said line of bubbles of said discharged gas substantially simultaneously along the length of said string of bubbles and at a predetermined distance from said container to generate an elongated cylindrical wave front from radiating from said string of bubbles.

11. The method of claim 10 wherein the container is towed in a substantially horizontal position.

12. The method of claim 10 wherein the container is positioned at an angle to the horizon at the time gas is discharged therefrom.

13. In seismic prospecting for geological structures disposed beneath a body of water, a method for creating explosive energy along a substantially continuous line, said method comprising the steps of disposing in said water at a predetermined depth and position an elongated flexible tubular container for a gaseous mixture, towing said container through said water at a predetermined depth and position, mixing gases together in proportions to form an exposive gas mixture, continuously forcing a quantity of said explosive gas mixture into one end of said container in a quantity of fill it, periodically discharging a plurality of small volumes of said explosive gas from said container at spaced intervals therealong and into the water surrounding said container to create a linear sound source formed by a string of gas bubbles, periodically igniting said line of bubbles of said discharged gas mixture substantially simultaneously at a plurality of points along the length of said string of bubbles and at a predetermined distance from said container to generate an elongated cylindrical wave front radiating from said string of bubbles.

14. For use in seismic prospecting for geological structures disposed beneath a body of water, apparatus for forming a sound source for creating explosive energy over an area of predetermined configuration said apparatus comprising a body member having flow passage means therein extending substantially the length thereof, gas conduit means secured to said body member at least at one point and in communication between said flow passage means of said body member and a source of combustible gas under pressure, and a plurality of discharge port means arranged at spaced intervals on said body member for discharging separate small portions of a combustible gas therefrom.

15. The apparatus of claim 14 including valve means normally closing said discharge port means.

16. The apparatus of claim 15 wherein the valve means are of a pressure-responsive type.

17. The apparatus of claim 14 including gas-ignition means carried by said body member at a predetermined distance thereabove.

18. For use in seismic prospecting for geological structures disposed beneath a body of water, apparatus for forming a linear sound source for creating explosive energy along a substantially continuous line, said apparatus comprising an elongated body member having flow passage means therein extending the length thereof, gas conduit means secured to one end of said body member in communication between said flow passage means of said body member and a source of combustible gas under pressure, a plurality of discharge port means arranged at spaced intervals along said body member for discharging separated small portions of a combustible gas mixture therefrom, and gas-ignition means carried by said body member at a predetermined distance thereabove.

19. For use in seismic prospecting for geological structures disposed beneath a body of water, apparatus for forming a linear sound source for creating explosive energy along a susbtantially continuous line, said apparatus comprising an elongated flexible body member having flow passage means therein extending the length thereof, cable connector means at the lead end of said body member for securing a tow cable thereto, a gas-mixture chamber formed in the lead end of said body member, gas conduit means secured to the lead end of said body member in communication between said gas-mixing chamber and a source of combustible gases under pressure, a plurality of discharge port means arranged at spaced intervals along said body member for simultaneously discharging separate small portions of a combustible gas mixture therefrom, and gas-ignition means carried by said body member at a predetermined distance thereabove.

20. The apparatus of claim 18 wherein the gas-ignition means comprises at least one spark gap positioned on an upwardly-extending rod element in the path of gas bubbles rising from said discharge ports.

21. The apparatus of claim 18 wherein the gas-ignition means comprises at least one light source positioned on an upwardly-extending rod element at a level near the point at which light-explosible gas bubbles are to be exploded.

References Cited by the Examiner

UNITED STATES PATENTS 3,039,599    5/62    Ellsworth _____ 340—12

SAMUEL FEINBERG, *Primary Examiner.*

CHESTER L. JUSTUS, *Examiner.*